United States Patent [19]

Collonia

[11] 4,313,408

[45] Feb. 2, 1982

[54] DEVICE FOR THE CONTROL OF THE TRAVELING SPEED OF A MOTOR VEHICLE

[75] Inventor: Harald Collonia, Königstein, Fed Rep. of Germany

[73] Assignee: VDO Adolf Schindling AG, Frankfurt, Fed. Rep. of Germany

[21] Appl. No.: 86,828

[22] Filed: Oct. 22, 1979

Related U.S. Application Data

[62] Division of Ser. No. 894,371, Apr. 7, 1978.

[30] Foreign Application Priority Data

Mar. 30, 1977 [DE] Fed. Rep. of Germany ....... 2714113
Dec. 2, 1977 [DE] Fed. Rep. of Germany ....... 2753702
Dec. 2, 1977 [DE] Fed. Rep. of Germany ....... 2753703
Dec. 9, 1977 [DE] Fed. Rep. of Germany ....... 2754826

[51] Int. Cl.³ .............................................. F02D 11/10
[52] U.S. Cl. .................................. 123/340; 123/352
[58] Field of Search ....................... 123/102, 340, 352

[56] References Cited

U.S. PATENT DOCUMENTS

| | | | |
|---|---|---|---|
| 3,667,020 | 5/1972 | Senzaki | 123/361 |
| 3,700,996 | 10/1972 | Gutting | 123/361 |
| 3,716,035 | 2/1973 | Adler et al. | 123/361 |
| 3,809,034 | 5/1974 | Durichen | 123/361 |
| 4,084,659 | 4/1978 | Abend | 123/352 |
| 4,112,885 | 9/1978 | Iwata | 123/98 |
| 4,117,903 | 10/1978 | Fleischer | 123/361 |
| 4,120,373 | 10/1978 | Fleischer | 123/399 |

*Primary Examiner*—Ronald B. Cox
*Attorney, Agent, or Firm*—Martin A. Farber

[57] ABSTRACT

A device for the control of the traveling speed of a motor vehicle with a regulating unit actuateable by the vehicle driver, particularly a gas pedal, and means for transmission of the movement of the same to an element, particularly the throttle valve, which influences the fuel-air mixture. Measures are provided which compensate for abnormal switching conditions of the device. An electrical controller is provided, the desired value input of which is applied with the output signal of a first electrical position indicator, the latter being coupled with the regulating unit and the actual value input of which is applied with the output signal of a second electrical position indicator, the latter being coupled with the setting member or positioning actuator of an electrical setting or adjusting device, the actuator standing in connection with the element which influences the air-fuel mixture.

6 Claims, 4 Drawing Figures

DEVICE FOR THE CONTROL OF THE TRAVELING SPEED OF A MOTOR VEHICLE

This is a division of application Ser. No. 894,371, filed Apr. 7, 1978.

The invention relates to a device for the control of the traveling speed of a motor vehicle with a regulating unit actuateable by the vehicle driver, particularly a gas pedal, and means for transmission of the movement of the same to an element, particularly the throttle valve, which influences the fuel-air mixture.

With known devices of this type the gas pedal is located in the vehicle space, the gas pedal being connected with the throttle valve in the motor space either by means of a Bowden cable or by means of rods. Particularly with trucks by which the gas pedal and throttle valve generally are arranged with a larger distance from one another, this led to comparatively high displacement or regulating forces on the gas pedal, which can be avoided to a certain extent only by careful laying of the Bowden cable or by a special construction of the rods. Beyond that such type of devices have a construction which is disadvantageous in assembly or installation and maintenance.

The invention cooperates with an electrical controller (1), the desired value input of which is applied with the output signal of a first electrical position encoder or indicator (9), the latter being coupled with the regulating unit (10) and the actual value input of which is applied with the output signal of a second electrical position encoder or indicator (8), the latter being coupled with the setting member or positioning actuator (6) of an electrical setting or adjusting device (4), the actuator (4) standing in connection with the element (15) which influences the air-fuel mixture.

Upon actuation of the brake of the vehicle or the vehicle clutch, the coupling device (7) between the servomotor (5) and the positioning actuator (6) is switched inoperative, that is the coupling separates the servomotor from the positioning actuator (6), so that the throttle valve (15) unhindered can be pivoted back into its rest position as a result of the resetting or restoring spring which engages thereon. Upon the swinging back of the throttle valve, by this also the positioning actuator i.e. regulating unit (6) and the position encoder or indicator (8) which stands in connection with the latter are moved back into their rest position.

Under circumstances it can occur that, for example with a freezing or icing of the suction or intake system, the throttle valve can not be pulled back into its rest position from its pivoted position by the spring engaging thereon, so that an undesired abnormal action or behavior of the motor can result. Such a type of abnormal operating condition indeed can occur also with the known devices by which the gas pedal is connected via a Bowden cable or via rods with the throttle valve, however there the possibility exists, to be able to move the throttle valve back again into its rest position by drawing out the gas pedal.

According to the invention, such type of abnormal action or behavior of the device is stopped in the manner that means (25, 26) are provided which inoperatively switch the coupling device (7) only for a short period of time upon actuation of the brake of the motor vehicle, of the vehicle clutch and/or of another element which produces a resetting or zeroing signal.

By this measure it is achieved with a non-occurring return movement of the throttle valve during the short period of time of inoperative switching, that the latter is positively moved back into its rest position by the servomotor subsequently upon the next operative reswitching of the coupling device. As tests have shown, it suffices to switch the coupling device inoperative for approximately 0.2 seconds, that is to separate the connection between the servomotor and the positioning actuator. During this time a tilting back of the throttle valve into its original position is possible without anything more. Of course the time duration during which the coupling device is switched inoperative also can be longer, however the danger exists that particularly with switching operations, disturbing effects result in the control course.

According to one embodiment of the invention that a monostable multivibrator (25) is provided which, upon actuation of the vehicle brake of the vehicle clutch and/or of another element which produces a resetting or zeroing signal, is controlled into its quasistable condition and during this condition, the coupling device (7) is inoperatively switched, i.e., disconnected. The triggering of the monostable multivibrator can take place directly from the other motor vehicle brake, the vehicle clutch and/or the element. The relaxation time is sized such that the positive return movement of the throttle valve into its rest position only takes place when the normal decontrol time has expired; the positive return movement in this case thus does not interfere in the normal decontrol operation.

With the previously mentioned measures for stopping of an abnormal action or behavior it is necessary that the servomotor produces a certain minimum moment of rotation, with which the throttle valve can be moved back into its starting position. If the icing is too intense or if the rods which are provided between the throttle valve and the servomotor are jammed or if indeed the coupling device between the servomotor and the rods is not in order, thus return movement of the throttle valve into its starting position by the motor is not possible. Particularly if the throttle valve locks or sticks in its open or full throttle position or in a position adjacent this position, dangerous traffic situations can result which under circumstances indeed can lead to a traffic accident.

This can be avoided in the manner that means (27, 28, 31) are provided by which upon a deviation of the output signal of the second position encoder (8) from that of the first position encoder (9) by a certain predetermined amount, the ignition circuit of the motor vehicle is interrupted.

In this manner it is guaranteed that with a locking or catching of the throttle valve in a position outside of its rest position, the ignition circuit of the motor vehicle is interrupted; the drive system of the motor vehicle thus is placed out of operation. Dangerous traffic situations thereby can no longer occur as a result of a locked or stuck throttle valve.

It has proven advantageous when the means contains an optical and/or acoustic warning device (29), which can be operatively switched timewise prior to the interruption of the ignition circuit. In this manner the driver is informed of the inoperativeness of the drive system of his motor vehicle which is constrained to occur shortly after that, and consequently the driver still can take corresponding proper traffic measures, such as pulling over to the right street side. On the same basis it has proven advantageous to provide a manually operable switch (32) for inoperatively switching (disconnecting) the means. Thereby the possibility exists to be able to again place the drive system in operation after a provided emergency shut-down of the drive system, in order, for example, to move the motor vehicle away from a danger zone.

According to an advantageous embodiment, the means comprises a comparator (27) to which on the one hand the output signal of the second position encoder is fed and on the other hand the output of the first position encoder is fed, and a threshold value switch (28) is connected thereafter to the comparator (27), which switch (28) directly or indirectly, for example via a relay, switches or controls the ignition circuit.

It has now been shown that, particularly during shifting operations by which the gas pedal in a known manner is withdrawn quickly and subsequently the vehicle clutch is immediately actuated, yet also during braking operations, the controller can only follow such an operation with a time delay so strong such that for a short time an undesired rotational speed overrunning or racing of the motor occurs.

This disadvantage is avoided according to a further concept and object of the invention in the manner that before actuation of the vehicle clutch and/or of the vehicle brake, the coupling device (7) is driven in the sense of a separation thereof.

This can occur according to one embodiment in the manner that the resetting or return speed of the regulating unit (9, 10) is detected, and upon exceeding a certain predetermined return or resetting speed, the coupling device (7) is triggered or driven in the sense of a separation.

In this manner thus the signal which is necessary for the triggering or driving of the coupling device is derived from the return or resetting speed of the gas pedal, which return speed indeed with the shifting operation as well as also with a braking operation which suddenly becomes necessary is particularly high, and consequently can be used as criterium for such a shifting operation and braking operation, respectively. The detection and evaluation of the resetting speed can take place in an advantageous manner in that the output of the position encoder (9) which is coupled with the regulating unit (10) is connected with a threshold value switch (19) via a differentiating member (18), the threshold value switch driving the control circuit (20, 21) of the coupling device (7). In this manner the changing speed of the signal coming from the position encoder thereby thus is detected. Upon a certain magnitude of the signal change, the threshold value switch responds and triggers the coupling device in the sense of a separation.

According to another embodiment, the coupling device (7) is triggered in the sense of a separation when a certain predetermined difference between the desired value and actual value is reached. In this manner the conventional existing sluggishness or inertia of the controller is used as criterium for the subsequent actuation of the vehicle clutch or of the motor vehicle brake. In one embodiment advantageously relating to this, a threshold value switch (24) is provided which is fed by the output signal of the controller (2), which threshold value switch drives the control circuit (20, 21) of the coupling device (7).

With the above and other objects and advantages in view, the present invention will become more clearly understood in connection with the following detailed description of preferred embodiments, when considered with the accompanying drawings, of which:

Figure 1:
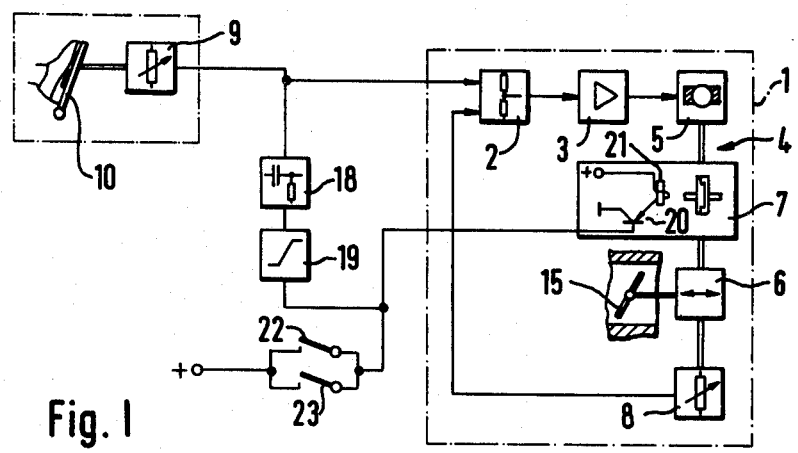
FIG. 1 is a schematic block circuit diagram of a device by which the control signal for the coupling device is obtained from the resetting or return speed of the positioning or regulating unit.

The device according to FIG. 1 contains an electrical controller 1, which essentially comprises a comparator 2, an amplifier 3 connected following the latter in series and a setting or adjusting device 4, the latter comprising an electrical servomotor 5, a setting member or positioning actuator 6 (i.e., a regulating unit) and an electromagnetic coupling or clutch 7 connected therebetween. The controller 1 in addition contains a setting transmitter or position encoder 8 which is connected with the actuator 6 and transmits to one input of the comparator 2 a voltage proportional to the prevailing position of the position encoder 8. On the other input of the comparator 2, which for example is constructed of a series connection of two resistors which are applied at their free ends with the signals to be compared and the ends of which are connected with one another form the comparator output, there lies the position encoder 9, the latter being formed as a variable resistor and coupled with the gas pedal 10 of the motor vehicle. The position encoder 9 which delivers a voltage signal which is dependent on the prevailing position of the gas pedal 10 is directly connected to one input of the comparator 2.

The output of the position encoder 9 additionally is in connection with a differentiating member 18 to which a threshold value switch 19 is connected following thereafter. The output of the threshold value switch 19 controls a transistor 20, in the emitter collector path of which there is disposed the excitation winding 21 of the electromagnetic coupling 7.

For explanation of the manner of operation of the device, be it assumed that we start out from the condition in which the gas pedal 10 is pivoted by a certain amount from its rest position and consequently the position encoder 9 sends a signal to the comparator 2 of the controller 1, which signal corresponds to this pivoting angle. Consequently also the throttle valve 15 is pivoted and indeed by a value corresponding to the angle of pivoting of the gas pedal. The motor thus rotates with a certain rotational speed.

If now on the basis of a shifting operation there occurs a return or resetting of the gas pedal into its rest position, thus the output signal which is emitted from the position encoder 9 changes with the changing speed typical with such a return or resetting of the gas pedal. This self-changing signal is differentiated in the differentiaing member 18 and thereafter fed to the threshold value switch 19 which controls the transistor 20 in its reverse (nonconducting, high-resistance) direction, which transistor 20 normally operates in the passage or transmission direction. The result is that the coupling 7 is actuated in the sense of a separation. This actuation takes place before an actuation of the coupling 7 via the clutch switch 22 and the brake switch 23, respectively.

Figure 2:
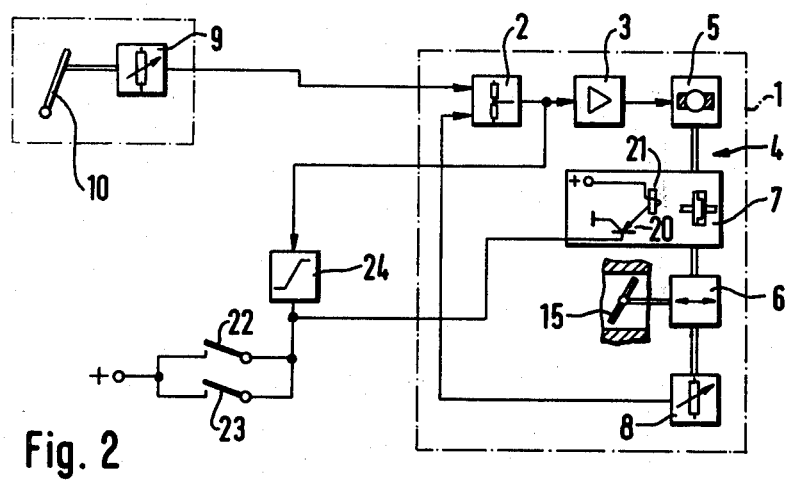
FIG. 2 is a block circuit diagram of a device by which the control signal for the coupling device is obtained from the actual-desired value difference.

The device illustrated in FIG. 2 up to the triggering of the transistor 20 has the same construction as the device according to FIG. 1. As seen, instead here a threshold value switch 24 is connected at the output of the comparator 2, the output signal of the switch 24 controlling the transistor 20 via its base. The triggering of the transistor 20 takes place if a difference occurs between the desired value and the actual value, which both are fed to the comparator 2, which difference is exceeded by a certain predetermined value, the latter being fixable by the threshold value switch 24.

Figure 3:
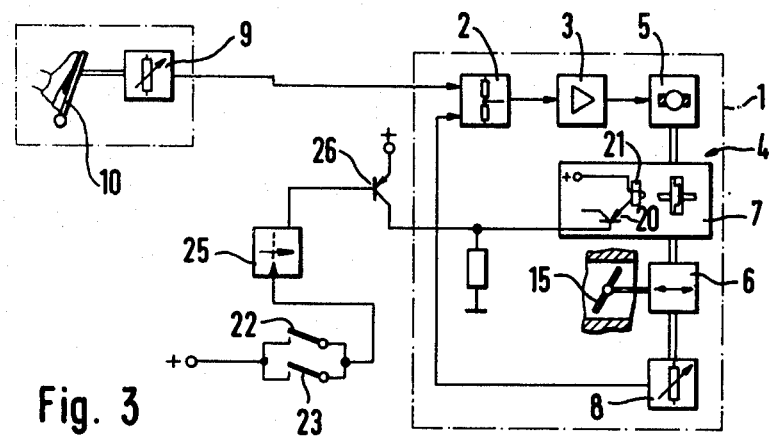
FIG. 3 is a block circuit diagram of a device by which the means are provided which occasionally inoperatively switch the coupling device.

By the device illustrated in FIG. 3 (where instead of the switch 24 a transistor 26 and a monostable multivibrator 25 are operatively connected to the switches 22, 23 and to the transistor 20, respectively) for explanation of its manner of operation, assume that we start out from the condition that the gas pedal 10 is found in a position outside of its rest position and consequently the motor runs with a rotational speed which lies above the idling rotational speed. The throttle valve 15 is located in a position corresponding to this rotational speed. The excitation coil 21 of the electromagnetic coupling 7 is applied with current and the coupling is in its coupled position in which it connects the setting actuator 6 with the motor 5.

As soon as the brake or the clutch of the vehicle is actuated and consequently the switch 23 or the switch 22, respectively, is closed, the switch 23 being operatively coordinated to the brake, and the switch 22 being operatively coordinated to the clutch, then the transistor 20 which is connected in the excitation circuit of the coupling 7 is inhibited or blocked and the coupling 7 is actuated in the sense of a separation, since the monostable multivibrator 25 is controlled in its quasi-stable condition and the transistor 26 is controlled in the reverse non-conducting direction. After flipping the monostable multivibrator 25 back, the transistor 26 again becomes conducting and thereby controls the transistor 20 in its conducting condition. The excitation coil 21 is again applied with current and the coupling again connects the setting actuator 6 with the motor 5, which motor provides the positive return movement of the throttle valve 15 into its rest position, in case it first is not flipped back.

Figure 4:
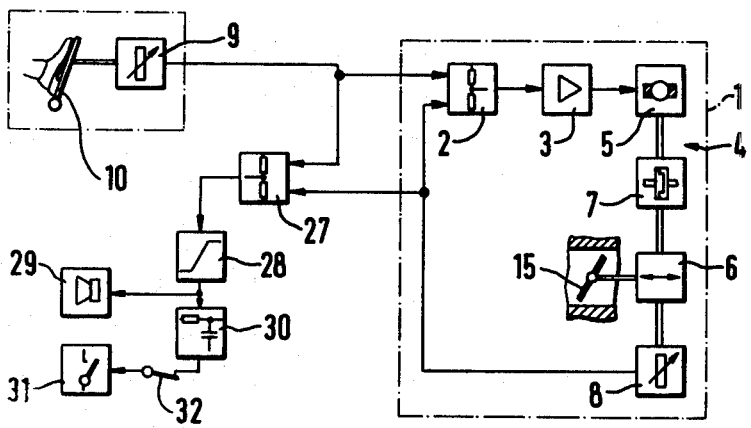
FIG. 4 is a block circuit diagram of a device with means for interrupting the ignition current circuit during deviation of the position encoder output signals.

With the device according to FIG. 4 the position encoder 9 and the position encoder 8 are connected to the two inputs of a comparator 27, the output of which stands in connection with a threshold value switch 28. The output of the threshold value switch 28 on the one hand is connected to an acoustical alarm or warning device 29 and on the other hand is connected to a switching stage 31 via a timing or time delay circuit 30, the switching element of the switching stage 31 being disposed in the ignition circuit of the vehicle.

For explanation of the manner of operation of this device be it assumed that we start out where the gas pedal 10 is pivoted from its rest position and consequently also the throttle valve 15 is pivoted by a corresponding angle. The signals which appear at the inputs of the comparator 2 and of the comparator 27 are consequently equal and the output signal of the comparator 27 is such that the threshold value switch 28 is not switched or operated. If the driver now removes his foot from the gas pedal 10, thus this returns into its rest position. If the simultaneous resetting or return of the throttle valve 15 now were prevented in the manner that the suction or intake system is covered with ice. The result is that the signal which is emitted from the position encoder 8 does not change and consequently at the comparator 27, between the signal coming from the position encoder 8 and that which comes from the position encoder 9, such a signal difference arises that the comparator 27 drives the threshold value switch 28. The acoustic warning device 29 is activated and after a time delay of several seconds, the time delay being provided by the timing stage 30, the ignition circuit of the motor is turned off via the stage 31. If between the stage 30 and the stage 31 a switch 32 is present, then by means of this normally closed switch, the stage 31 can be switched inoperative, i.e. turned off, and consequently the drive system of the motor vehicle can be placed in operation.

While there has been disclosed several embodiments of the invention, it is to be understood that these embodiments are given by example only and not in a limiting sense.

I claim:

1. A device for the control of the traveling speed of a motor vehicle with a regulating unit actuateable by the vehicle driver, particularly a gas pedal, and means for transmission of the movement of the same to an element, particularly the throttle valve, which influences the fuel-air mixture, comprising
   a regulating unit,
   a first electrical position encoder being coupled with said regulating unit, said first position encoder having an output with an output signal,
   means for influencing the air-fuel mixture of the vehicle,
   an electrical adjusting device including a positioning actuator, the latter being connected with said means,
   a second electrical position encoder being coupled with said positioning actuator, said second electrical position encoder having an output with an output signal,
   an electrical controller including said electrical adjusting device and having a desired value input connected with the output of said first electrical position encoder and applied with the output signal of said first electrical position encoder and having an actual value input connected with the output of said second electrical position encoder and applied with the output signal of said second electrical position encoder,
   said adjusting device includes a coupling means operatively connected to said positioning actuator,
   said element and said regulating unit constitute corresponding members,
   means for detecting a resetting speed of one of said members,
   means for triggering said coupling means in a sense of disconnection thereof sooner than actuation of the vehicle clutch and/or of the vehicle brake, said triggering means being operatively connected to said detecting means and for triggering said coupling means in the sense of disconnection upon exeeding a certain predetermined value of the resetting speed.

2. The device according to claim 1, wherein
   said coupling means includes a control circuit,
   a differentiating member connected to the output of said first position encoder, said triggering means includes a threshold value switch means connected to said differentiating member for driving said control circuit of said coupling means.

3. The device according to claim 1, wherein said detecting means directly detects the resetting speed of said regulating unit.

4. The device according to claim 3, wherein said regulating unit is the gas pedal.

5. The device according to claim 1, wherein said element is the throttle valve.

6. The device according to claim 2, wherein said control circuit includes a transistor and an excitation winding of said coupling means operatively connected in series, said transistor has a base and constitutes a switch means for the disconnection of said coupling means, said threshold value switch means is connected to the base of said transistor, a brake switch and a clutch switch are operatively connected to the base of said transistor.

* * * * *